Patented Sept. 12, 1922.

1,429,169

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing. Application filed January 5, 1922. Serial No. 527,245.

*To all whom it may concern:*

Be it known that I, PAUL C. SEEL, a citizen of the United States of America, residing at Rochester, in the county of Monroe and State of New York, have invented certain new and useful Improvements in Cellulose-Ether Compositions, of which the following is a full, clear, and exact specification.

This invention relates to new compositions of matter in which cellulose ethers are so dissolved that they may be made into products advantageously used in the plastic and analogous arts, such, for instance, as sheet or film manufacture and varnish manufacture.

One object of my invention is to provide a composition which may be made into permanently transparent, strong, and flexible sheets, films or moulded articles which possess the desired properties in the plastic arts. Further objects will hereinafter appear.

I have discovered that compositions of matter having the properties desired in the film making and other plastic arts can be obtained by mixing or compounding cellulose ethers, say of the type indicated in U. S. Patent No. 1,188,376, Lillienfeld, June 20, 1916, with dichlorpropane.

By way of illustration, I may dissolve cellulose ethers, like water-insoluble ethyl cellulose, in dichlorpropane until a homogeneous solution of the required viscosity is obtained. For film manufacture, it is preferable to dissolve 1 part of the ether by weight in from 4 to 6 parts of the dichlorpropane. Since this solvent has a fairly low boiling point, it evaporates, and the film cures or sets with a rapidity which is sufficient for many purposes. If a more rapid setting of the film is required, volatile substances, which act as a vehicle for carrying the other ingredients, may be added, methyl alcohol being an example. Of course, the vehicle should not be used in such proportion that it precipitates the ether.

Other substances which impart useful qualities to the film may be added if desired, such, for instance, as triphenyl or tricresyl phosphate, camphor, monochlornaphthalene, etc. All of the ingredients are of the commercial type, sufficiently purified for the process of film manufacture, so as to give a dope yielding films having the proper relative freedom from color.

Having thus described my invention, what I claim as new and desire to secure by Letters Patent is:

1. A composition of matter comprising cellulose ether and dichlorpropane.

2. A composition of matter comprising 1 part by weight of water-insoluble ethyl cellulose and from 4 to 6 parts by weight of dichlorpropane.

Signed at Rochester, New York, this 22nd day of December, 1921.

PAUL C. SEEL.